US011997104B2

(12) United States Patent
Hu et al.

(10) Patent No.: US 11,997,104 B2
(45) Date of Patent: *May 28, 2024

(54) SECURITY REDUNDANCY

(71) Applicant: NOKIA SOLUTIONS AND NETWORKS OY, Espoo (FI)

(72) Inventors: Jun Hu, San Jose, CA (US); John Coffell, Kanata (CA)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,149

(22) Filed: May 17, 2023

(65) Prior Publication Data

US 2023/0291745 A1 Sep. 14, 2023

Related U.S. Application Data

(63) Continuation of application No. 17/132,470, filed on Dec. 23, 2020, now Pat. No. 11,695,778.

(51) Int. Cl.
*H04L 9/40* (2022.01)
(52) U.S. Cl.
CPC ........ *H04L 63/105* (2013.01); *H04L 63/0485* (2013.01); *H04L 63/1425* (2013.01); *H04L 63/18* (2013.01); *H04L 63/20* (2013.01)
(58) Field of Classification Search
CPC .............. H04L 63/105; H04L 63/0485; H04L 63/1425; H04L 63/18; H04L 63/20
USPC .......................................................... 726/4
See application file for complete search history.

(56) References Cited

U.S. PATENT DOCUMENTS 7,689,722 B1 * 3/2010 Timms .................... H04L 69/40
718/1

OTHER PUBLICATIONS

Sheffer, Y., et al., "IPsec Gateway Failover Protocol," draft-sheffer-ipsec-failover-02.txt, Network Working Group, Nov. 15, 2007, 23 pages.
Nokia, "Multiservice ISA and ESA Guide Release 20.7.R1, Section 9: Multi-Chassis IPSec Redundancy Overview," Jul. 2020, pp. 592-599.
EP Search Report mailed in corresponding EP Patent Application No. 21208895.9 dated Apr. 25, 2022, 9 pages.

* cited by examiner

*Primary Examiner* — Michael S McNally
(74) *Attorney, Agent, or Firm* — Tong, Rea, Bentley & Kim, LLC

(57) ABSTRACT

Various example embodiments for supporting security in a communication system are presented. Various example embodiments for supporting security in a communication system may be configured to support stateful security redundancy in the communication system. Various example embodiments for supporting stateful security redundancy in a communication system may be configured to support stateful security redundancy for a set of client devices based on a set of security nodes arranged in a security redundancy architecture. Various example embodiments for supporting stateful security redundancy for a set of client devices based on a set of security nodes arranged in a security redundancy architecture may be configured to support stateful security redundancy for a client device based on a security redundancy domain including an active security node and one or more standby security nodes.

20 Claims, 8 Drawing Sheets

SECURITY REDUNDANCY

CROSS-REFERENCE TO RELATED APPLICATIONS

This application is a continuation of U.S. patent application Ser. No. 17/132,470, filed on Dec. 23, 2020, and entitled SECURITY REDUNDANCY, which is hereby incorporated by reference herein in its entirety.

TECHNICAL FIELD

Various example embodiments relate generally to communication systems, more particularly but not exclusively, to supporting secure communications in communication systems.

BACKGROUND

Communication systems may employ various security mechanisms for supporting secure communications. For example, one security mechanism for supporting secure communications in communication systems is Internet Protocol Security (IPSec), which is a secure network protocol suite for providing secure encrypted communications between two nodes based on authentication and encryption of packets of data exchanged between the two nodes.

SUMMARY

In at least some example embodiments, an apparatus includes at least one processor and at least one memory including a set of instructions, wherein the set of instructions is configured to, when executed by the at least one processor, cause the apparatus to determine, by a security node for a redundancy domain including the security node and one or more other security nodes, an administrative role of the security node within the redundancy domain and a runtime role of the security node within the redundancy domain, perform, by the security node based on interaction with at least one of the one or more other security nodes for a secure channel associated with a client device and having secure channel state information associated therewith, a process for synchronizing at least a portion of the secure channel state information, and perform, by the security node, a process for causing traffic of the client device to be attracted to an active security node of the redundancy domain that is configured to provide security for communications of the client device based on the at least a portion of the secure channel state information. In at least some example embodiments, the administrative role of the security node within the redundancy domain is determined based on configuration information received by the security node from a management interface. In at least some example embodiments, the runtime role of the security node within the redundancy domain is determined based on the administrative role of the security node within the redundancy domain. In at least some example embodiments, the runtime role of the security node within the redundancy domain is determined based on interaction by the security node with each of the one or more other security nodes. In at least some example embodiments, the runtime role of the security node within redundancy domain is determined based on an election protocol configured to operate based on the administrative role of the security node within the redundancy domain. In at least some example embodiments, the runtime role of the security node in the redundancy domain is that the security node is the active security node of the redundancy domain. In at least some example embodiments, the set of instructions is configured to, when executed by the at least one processor, cause the apparatus to at least send, by the security node based on the process for synchronizing the at least a portion of the secure channel state information, the at least a portion of the secure session state information to each of the one or more other security nodes. In at least some example embodiments, the set of instructions is configured to, when executed by the at least one processor, cause the apparatus to at least advertise, by the security node based on the process for causing traffic of the client device to be attracted to the active security node of the redundancy domain, a gateway endpoint address route having a first metric that is better than respective metrics of respective gateway endpoint address routes advertised by the one or more other security nodes. In at least some example embodiments, the set of instructions is configured to, when executed by the at least one processor, cause the apparatus to at least advertise, by the security node based on the process for causing traffic of the client device to be attracted to the active security node of the redundancy domain, advertise a payload route having a first metric that is better than respective metrics of respective payload routes advertised by the one or more other security nodes. In at least some example embodiments, the set of instructions is configured to, when executed by the at least one processor, cause the apparatus to at least provide, by the security node based on the at least a portion of the secure channel state information, security for communications of the client device. In at least some example embodiments, the runtime role of the security node in the redundancy domain is that the security node is a backup security node of the redundancy domain. In at least some example embodiments, the set of instructions is configured to, when executed by the at least one processor, cause the apparatus to at least receive, by the security node based on the process for synchronizing the at least a portion of the secure channel state information, the at least a portion of the secure session state from the active security node of the redundancy domain. In at least some example embodiments, the set of instructions is configured to, when executed by the at least one processor, cause the apparatus to at least determine, by the security node based on a heuristic, additional security session state information for the secure channel of the client device. In at least some example embodiments, the set of instructions is configured to, when executed by the at least one processor, cause the apparatus to at least advertise, based on the process for causing traffic of the client device to be attracted to the active security node of the redundancy domain, a gateway endpoint address route having a metric that is worse than a metric of a gateway endpoint address route advertised by the active security node of the redundancy domain. In at least some example embodiments, the set of instructions is configured to, when executed by the at least one processor, cause the apparatus to at least advertise, based on the process for causing traffic of the client device to be attracted to the active security node of the redundancy domain, a payload route having a metric that is worse than a metric of a payload route advertised by the active security node of the redundancy domain. In at least some example embodiments, the set of instructions is configured to, when executed by the at least one processor, cause the apparatus to at least provide, by the security node, backup for the active security node of the redundancy domain. In at least some example embodiments, the set of instructions is configured to, when executed by the at least one processor, cause the apparatus to at least switch, by the security node, from an operational backup role in the redundancy domain to an operational active role in the redundancy domain based on a determination that the active security node is unavailable. In at least some example embodiments, one of the other security nodes is configured as a backup security node in the redundancy domain and in a second redundancy domain and the set of instructions is configured to, when executed by the at least one processor, cause the apparatus to at least switch, by the security node, from the operational backup role in the redundancy domain to the operational active role in the redundancy domain based on a determination that the one of the other security nodes has switched to an operational active role in the second redundancy domain. In at least some example embodiments, the security node is configured to operate as a backup security node in a second redundancy domain. In at least some example embodiments, the redundancy domain is based on Internet Protocol Security (IPSec), the security node is an IPSec gateway, and the client device is an IPSec client.

In at least some example embodiments, a non-transitory computer-readable medium stores a set of instructions configured to cause an apparatus to determine, by a security node for a redundancy domain including the security node and one or more other security nodes, an administrative role of the security node within the redundancy domain and a runtime role of the security node within the redundancy domain, perform, by the security node based on interaction with at least one of the one or more other security nodes for a secure channel associated with a client device and having secure channel state information associated therewith, a process for synchronizing at least a portion of the secure channel state information, and perform, by the security node, a process for causing traffic of the client device to be attracted to an active security node of the redundancy domain that is configured to provide security for communications of the client device based on the at least a portion of the secure channel state information. In at least some example embodiments, the administrative role of the security node within the redundancy domain is determined based on configuration information received by the security node from a management interface. In at least some example embodiments, the runtime role of the security node within the redundancy domain is determined based on the administrative role of the security node within the redundancy domain. In at least some example embodiments, the runtime role of the security node within the redundancy domain is determined based on interaction by the security node with each of the one or more other security nodes. In at least some example embodiments, the runtime role of the security node within redundancy domain is determined based on an election protocol configured to operate based on the administrative role of the security node within the redundancy domain. In at least some example embodiments, the runtime role of the security node in the redundancy domain is that the security node is the active security node of the redundancy domain. In at least some example embodiments, the set of instructions is configured to cause the apparatus to at least send, by the security node based on the process for synchronizing the at least a portion of the secure channel state information, the at least a portion of the secure session state information to each of the one or more other security nodes. In at least some example embodiments, the set of instructions is configured to cause the apparatus to at least advertise, by the security node based on the process for causing traffic of the client device to be attracted to the active security node of the redundancy domain, a gateway endpoint address route having a first metric that is better than respective metrics of respective gateway endpoint address routes advertised by the one or more other security nodes. In at least some example embodiments, the set of instructions is configured to cause the apparatus to at least advertise, by the security node based on the process for causing traffic of the client device to be attracted to the active security node of the redundancy domain, advertise a payload route having a first metric that is better than respective metrics of respective payload routes advertised by the one or more other security nodes. In at least some example embodiments, the set of instructions is configured to cause the apparatus to at least provide, by the security node based on the at least a portion of the secure channel state information, security for communications of the client device. In at least some example embodiments, the runtime role of the security node in the redundancy domain is that the security node is a backup security node of the redundancy domain. In at least some example embodiments, the set of instructions is configured to cause the apparatus to at least receive, by the security node based on the process for synchronizing the at least a portion of the secure channel state information, the at least a portion of the secure session state from the active security node of the redundancy domain. In at least some example embodiments, the set of instructions is configured to cause the apparatus to at least determine, by the security node based on a heuristic, additional security session state information for the secure channel of the client device. In at least some example embodiments, the set of instructions is configured to cause the apparatus to at least advertise, based on the process for causing traffic of the client device to be attracted to the active security node of the redundancy domain, a gateway endpoint address route having a metric that is worse than a metric of a gateway endpoint address route advertised by the active security node of the redundancy domain. In at least some example embodiments, the set of instructions is configured to cause the apparatus to at least advertise, based on the process for causing traffic of the client device to be attracted to the active security node of the redundancy domain, a payload route having a metric that is worse than a metric of a payload route advertised by the active security node of the redundancy domain. In at least some example embodiments, the set of instructions is configured to cause the apparatus to at least provide, by the security node, backup for the active security node of the redundancy domain. In at least some example embodiments, the set of instructions is configured to cause the apparatus to at least switch, by the security node, from an operational backup role in the redundancy domain to an operational active role in the redundancy domain based on a determination that the active security node is unavailable. In at least some example embodiments, one of the other security nodes is configured as a backup security node in the redundancy domain and in a second redundancy domain and the set of instructions is configured to cause the apparatus to at least switch, by the security node, from the operational backup role in the redundancy domain to the operational active role in the redundancy domain based on a determination that the one of the other security nodes has switched to an operational active role in the second redundancy domain. In at least some example embodiments, the security node is configured to operate as a backup security node in a second redundancy domain. In at least some example embodiments, the redundancy domain is based on Internet Protocol Security (IPSec), the security node is an IPSec gateway, and the client device is an IPSec client.

In at least some example embodiments, a method includes determining, by a security node for a redundancy domain including the security node and one or more other security nodes, an administrative role of the security node within the redundancy domain and a runtime role of the security node within the redundancy domain, performing, by the security node based on interaction with at least one of the one or more other security nodes for a secure channel associated with a client device and having secure channel state information associated therewith, a process for synchronizing at least a portion of the secure channel state information, and performing, by the security node, a process for causing traffic of the client device to be attracted to an active security node of the redundancy domain that is configured to provide security for communications of the client device based on the at least a portion of the secure channel state information. In at least some example embodiments, the administrative role of the security node within the redundancy domain is determined based on configuration information received by the security node from a management interface. In at least some example embodiments, the runtime role of the security node within the redundancy domain is determined based on the administrative role of the security node within the redundancy domain. In at least some example embodiments, the runtime role of the security node within the redundancy domain is determined based on interaction by the security node with each of the one or more other security nodes. In at least some example embodiments, the runtime role of the security node within redundancy domain is determined based on an election protocol configured to operate based on the administrative role of the security node within the redundancy domain. In at least some example embodiments, the runtime role of the security node in the redundancy domain is that the security node is the active security node of the redundancy domain. In at least some example embodiments, the method includes sending, by the security node based on the process for synchronizing the at least a portion of the secure channel state information, the at least a portion of the secure session state information to each of the one or more other security nodes. In at least some example embodiments, the method includes advertising, by the security node based on the process for causing traffic of the client device to be attracted to the active security node of the redundancy domain, a gateway endpoint address route having a first metric that is better than respective metrics of respective gateway endpoint address routes advertised by the one or more other security nodes. In at least some example embodiments, the method includes advertising, by the security node based on the process for causing traffic of the client device to be attracted to the active security node of the redundancy domain, advertise a payload route having a first metric that is better than respective metrics of respective payload routes advertised by the one or more other security nodes. In at least some example embodiments, the method includes providing, by the security node based on the at least a portion of the secure channel state information, security for communications of the client device. In at least some example embodiments, the runtime role of the security node in the redundancy domain is that the security node is a backup security node of the redundancy domain. In at least some example embodiments, the method includes receiving, by the security node based on the process for synchronizing the at least a portion of the secure channel state information, the at least a portion of the secure session state from the active security node of the redundancy domain. In at least some example embodiments, the method includes determining, by the security node based on a heuristic, additional security session state information for the secure channel of the client device. In at least some example embodiments, the method includes advertising, based on the process for causing traffic of the client device to be attracted to the active security node of the redundancy domain, a gateway endpoint address route having a metric that is worse than a metric of a gateway endpoint address route advertised by the active security node of the redundancy domain. In at least some example embodiments, the method includes advertising, based on the process for causing traffic of the client device to be attracted to the active security node of the redundancy domain, a payload route having a metric that is worse than a metric of a payload route advertised by the active security node of the redundancy domain. In at least some example embodiments, the method includes providing, by the security node, backup for the active security node of the redundancy domain. In at least some example embodiments, the method includes switching, by the security node, from an operational backup role in the redundancy domain to an operational active role in the redundancy domain based on a determination that the active security node is unavailable. In at least some example embodiments, one of the other security nodes is configured as a backup security node in the redundancy domain and in a second redundancy domain and the method includes switching, by the security node, from the operational backup role in the redundancy domain to the operational active role in the redundancy domain based on a determination that the one of the other security nodes has switched to an operational active role in the second redundancy domain. In at least some example embodiments, the security node is configured to operate as a backup security node in a second redundancy domain. In at least some example embodiments, the redundancy domain is based on Internet Protocol Security (IPSec), the security node is an IPSec gateway, and the client device is an IPSec client.

In at least some example embodiments, an apparatus includes means for determining, by a security node for a redundancy domain including the security node and one or more other security nodes, an administrative role of the security node within the redundancy domain and a runtime role of the security node within the redundancy domain, means for performing, by the security node based on interaction with at least one of the one or more other security nodes for a secure channel associated with a client device and having secure channel state information associated therewith, a process for synchronizing at least a portion of the secure channel state information, and means for performing, by the security node, a process for causing traffic of the client device to be attracted to an active security node of the redundancy domain that is configured to provide security for communications of the client device based on the at least a portion of the secure channel state information. In at least some example embodiments, the administrative role of the security node within the redundancy domain is determined based on configuration information received by the security node from a management interface. In at least some example embodiments, the runtime role of the security node within the redundancy domain is determined based on the administrative role of the security node within the redundancy domain. In at least some example embodiments, the runtime role of the security node within the redundancy domain is determined based on interaction by the security node with each of the one or more other security nodes. In at least some example embodiments, the runtime role of the security node within redundancy domain is determined based on an election protocol configured to operate based on the administrative role of the security node within the redundancy domain. In at least some example embodiments, the runtime role of the security node in the redundancy domain is that the security node is the active security node of the redundancy domain. In at least some example embodiments, the apparatus includes means for sending, by the security node based on the process for synchronizing the at least a portion of the secure channel state information, the at least a portion of the secure session state information to each of the one or more other security nodes. In at least some example embodiments, the apparatus includes means for advertising, by the security node based on the process for causing traffic of the client device to be attracted to the active security node of the redundancy domain, a gateway endpoint address route having a first metric that is better than respective metrics of respective gateway endpoint address routes advertised by the one or more other security nodes. In at least some example embodiments, the apparatus includes means for advertising, by the security node based on the process for causing traffic of the client device to be attracted to the active security node of the redundancy domain, advertise a payload route having a first metric that is better than respective metrics of respective payload routes advertised by the one or more other security nodes. In at least some example embodiments, the apparatus includes means for providing, by the security node based on the at least a portion of the secure channel state information, security for communications of the client device. In at least some example embodiments, the runtime role of the security node in the redundancy domain is that the security node is a backup security node of the redundancy domain. In at least some example embodiments, the apparatus includes means for receiving, by the security node based on the process for synchronizing the at least a portion of the secure channel state information, the at least a portion of the secure session state from the active security node of the redundancy domain. In at least some example embodiments, the apparatus includes means for determining, by the security node based on a heuristic, additional security session state information for the secure channel of the client device. In at least some example embodiments, the apparatus includes means for advertising, based on the process for causing traffic of the client device to be attracted to the active security node of the redundancy domain, a gateway endpoint address route having a metric that is worse than a metric of a gateway endpoint address route advertised by the active security node of the redundancy domain. In at least some example embodiments, the apparatus includes means for advertising, based on the process for causing traffic of the client device to be attracted to the active security node of the redundancy domain, a payload route having a metric that is worse than a metric of a payload route advertised by the active security node of the redundancy domain. In at least some example embodiments, the apparatus includes means for providing, by the security node, backup for the active security node of the redundancy domain. In at least some example embodiments, the method includes switching, by the security node, from an operational backup role in the redundancy domain to an operational active role in the redundancy domain based on a determination that the active security node is unavailable. In at least some example embodiments, one of the other security nodes is configured as a backup security node in the redundancy domain and in a second redundancy domain and the apparatus includes means for switching, by the security node, from the operational backup role in the redundancy domain to the operational active role in the redundancy domain based on a determination that the one of the other security nodes has switched to an operational active role in the second redundancy domain. In at least some example embodiments, the security node is configured to operate as a backup security node in a second redundancy domain. In at least some example embodiments, the redundancy domain is based on Internet Protocol Security (IPSec), the security node is an IPSec gateway, and the client device is an IPSec client.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
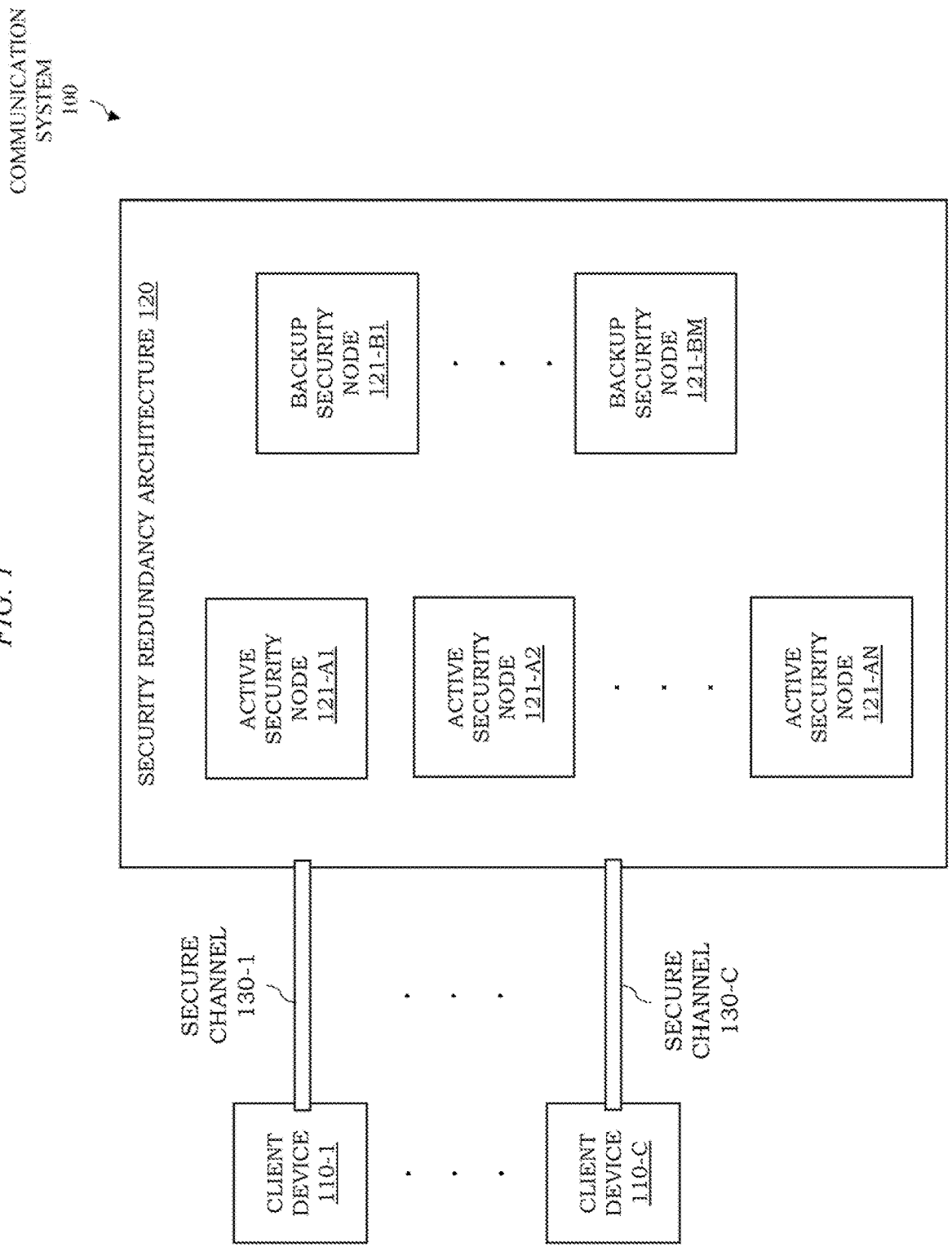
FIG. 1 depicts an example embodiment of a communication system including security nodes arranged in a security redundancy architecture configured to provide security redundancy for secure communications of client devices.

Various example embodiments for supporting security in a communication system are presented. Various example embodiments for supporting security in a communication system may be configured to support stateful security redundancy in the communication system. Various example embodiments for supporting stateful security redundancy in a communication system may be configured to support stateful security redundancy for a set of client devices based on a set of security nodes arranged in a security redundancy architecture. Various example embodiments for supporting stateful security redundancy for a set of client devices based on a set of security nodes arranged in a security redundancy architecture may be configured to support stateful security redundancy for the set of client devices based on an N:M redundancy arrangement in which N active security nodes may be supported by M backup security nodes (where N may be equal to or greater than one and M may be equal to or greater than one). Various example embodiments for supporting stateful security redundancy for a set of client devices based on a set of security nodes arranged in a security redundancy architecture may be configured to support stateful security redundancy for the set of client devices based on use of a single backup security node to support multiple active security nodes. Various example embodiments for supporting stateful security redundancy for a set of client devices based on a set of security nodes arranged in a security redundancy architecture may be configured to support stateful security redundancy for the set of client devices based on one or more security redundancy domains including an active security node and one or more standby security nodes. Various example embodiments for supporting stateful security redundancy for a set of client devices based on a set of security nodes arranged in a security redundancy architecture may be configured to enable a standby security node to support stateful security redundancy for the set of client devices based on a set of redundancy domains where a given standby security node may be associated with multiple redundancy domains and may provide backup for multiple active security nodes associated with the multiple redundancy domains, respectively. Various example embodiments for supporting stateful security redundancy for a set of client devices based on a set of security nodes arranged in a security redundancy architecture may be configured to support stateful security redundancy for the set of client devices based on configuration of each of the security nodes to support activity election functions (e.g., for enabling each of the security nodes to determine roles, respectively, such as administrative and runtime roles of the security nodes), synchronization functions (e.g., for synchronization of state information between security nodes), and activity aware routing functions (e.g., for enabling traffic of the client devices to be attracted to operational active security nodes rather than operational backup security nodes). Various example embodiments for supporting stateful security redundancy in a communication system may be configured to support stateful security redundancy based on a security protocol suite, which may include Internet Protocol Security (IPSec) or any other security protocol suite configured to support secure communications for a client device based on a security node. It will be appreciated that these and various other example embodiments and associated advantages or potential advantages of supporting security redundancy in communication systems may be further understood by way of reference to the various figures, which are discussed further below.

FIG. 1 depicts an example embodiment of a communication system including security nodes arranged in a security redundancy architecture configured to provide security redundancy for secure communications of client devices.

The communication system 100 includes a set of client devices 110-1 to 110-C (collectively, client device 110) and a security redundancy architecture 120 including a set of security nodes 121. The set of security nodes 121 includes a set of N active security nodes 121-A-1 to 121-A-N (collectively, active security nodes 121-A) and a set of M backup security nodes 121-B-1 to 121-B-M (collectively, backup security nodes 121-B), where N and M may or may not be equal. The M backup security nodes 121-B may be used to protect N active security nodes 121-A. The client devices 110 are configured to communicate using a set of secure channels 130-1 to 130-C (collectively, secure channels 130) between the client devices 110-1 to 110-C and the active security nodes 121-A of the security redundancy architecture 120 (illustratively, shown simply as being channels to the security redundancy architecture 120 since the security nodes 121 to which the client devices 110 are connected may change over time as active security nodes 121 become unavailable and backup security nodes 121 assume responsibility for securing communications of the client devices 110). The client devices 110 and the security nodes 121 are configured to support security for communications of the client devices 110 using the secure channels 130, where the security for the communications of the client devices 110 may be based on various security mechanisms such as authentication, encryption, or the like, as well as various combinations thereof.

The security redundancy architecture 120 may provide security for various types of client devices 110 based on various types of security nodes 121 using various types of secure channels 130. For example, the client devices 110 may include end user devices (e.g., smartphones, tablet computers, laptop computers, desktop computers, gaming systems, smart televisions, smart glasses, smart appliances, or the like), Internet-of-Things (IoT) devices (e.g., sensors, actuators, or the like), network devices (e.g., routers, switches, gateways, or the like, for providing security for communications of the network devices), or the like. For example, the security nodes 121 may include any devices configured to support security for communications of the client devices 110, such as gateways, servers, or the like. For example, the secure channels 130 may include any channels configured to support security for communications of the client devices 110, which may use various security mechanisms (e.g., various types of authentication, encryption, or the like) which may vary based on the security protocol suite that is applied to support security for communications of the client devices 110.

The security redundancy architecture 120 may provide security for communications of the client devices 110 based on a security protocol suite. For example, the communication system 100 may provide security for communications of the client devices 110 based on use of IPSec, which is a secure network protocol suite for providing secure encrypted communications between two computers based on authentication and encryption of packets of data exchanged between the two devices. It is noted that, where IPSec is used, the client devices 110 may be referred to as IPSec client devices (or, more generally, IPSec clients), the security nodes 121 may be referred to as security gateways (SeGWs) or IPSec gateways, and the secure channels 130 may be referred to as IPSec tunnels. It will be appreciated that, although primarily presented herein with respect to example embodiments in which the security protocol suite that is used to provide security for communications of the client devices 110 based on the security redundancy architecture 120 is IPSec, various other security protocol suites or security protocols may be used to provide security for communications of the client devices 110 based on the security redundancy architecture 120.

The security redundancy architecture 120 may provide security redundancy using various types of redundancy. The redundancy may be N:M redundancy, where N may be equal to or greater than one and M may be equal to or greater than one. For example, for an active security node 121-A there may be a single backup security node 121-B configured to support security for the associated client device 110 in case of a failure (i.e., 1:1 redundancy). For example, for an active security node 121-A there may be multiple backup security nodes 121-B configured to support security for the associated client device 110 in case of a failure (e.g., 1:M redundancy). For example, a backup security node 121-B may be configured to operate as a backup for multiple active security nodes 121-A in case of a failure of any of the multiple active security nodes 121-A (i.e., N:1 redundancy). For example, multiple backup security nodes 121-B may be configured to operate as backups for multiple active security nodes 121-A in case of a failure of any of the multiple active security nodes 121-A (i.e., N:M redundancy).

The security redundancy architecture 120 may provide security redundancy in a manner for supporting customized redundancy prioritization. For example, where multiple backup security nodes 121-B are providing security redundancy for an active security node 121-A, the multiple backup security nodes 121-B may be prioritized such that failover from the active security node 121-A to a backup security node 121-B in response to an initial failure and between the backup security nodes 121-B in response to additional failures or unavailability may be performed based on the prioritization of the backup security nodes 121-B. For example, SeGW-1 in City-A may be backed up by SeGW-2 in City-B and SeGW-3 in City-C with SeGW-2 being prioritized over SeGW-3 and, if SeGW-1 fails then SeGW-2 will be chosen to take over and, if SeGw-2 also fails or is not available, then SeGW-3 will be chosen to take over.

The security redundancy architecture 120 may provide security redundancy using redundancy that is based on various types of redundancy criteria. For example, the security redundancy provided for a client device 110 may be hardware-based redundancy (e.g., the active security node 121-A and one or more backup security nodes 121-B supporting security redundancy for the client device 110 may be hosted on different hardware elements to protect against hardware failures). For example, the security redundancy provided for a client device 110 may be geography-based redundancy (e.g., the active security node 121-A and one or more backup security nodes 121-B supporting security redundancy for the client device 110 may be hosted in different geographic locations which may vary at different scales, such as geographic locations in the different sections of the same city, geographic locations in different states or provinces of the same country, geographic locations in different countries, geographic locations on different continents, and so forth). It will be appreciated that security redundancy may be provided using redundancy that is based on various other types of redundancy criteria.

The security redundancy architecture 120 may provide security redundancy in a manner that is opaque to the client devices 110. The opacity of the security redundancy to a client device 110 ensures that the client device 110 only sees a single security device 121 at any given time. The opacity of the security redundancy to a client device 110 ensures that the client device 110 only sees a single security device 121 irrespective of the number of security devices 121 which are providing security redundancy for the client device 110. The opacity of the security redundancy to a client device 110 ensures that the client device 110 is unaware of a switchover from an active security gateway 121-A to a backup security gateway 121-B when the active security gateway 121-A is no longer able to provide security for communications of the client device 110 (e.g., the active security gateway 121-A fails, the active security gateway 121-A is no longer reachable by the client device 110 due to a network issue, or the like). It will be appreciated that supporting stateful security redundancy enables the security redundancy to be provided to client devices 110 in a manner that is opaque to the client devices 110.

The security redundancy architecture 120 may provide security for communications of the client devices 110 based on configuration of the security redundancy architecture 120 to support redundancy domains. A redundancy domain may include a single active security node 121-A and one or more backup security nodes 121-B that are available support the active security node 121-A. A redundancy domain may provide security for communications of a single client device 110 or may provide security for communications of multiple client devices 110 (where it will be appreciated that the multiple client devices 110 may be associated in various ways, such as based on a configuration action of the network provider to group the multiple client devices 110, a customer-based association of the multiple client devices where each of the multiple client devices 110 belongs to a particular customer, or the like). The redundancy domains may be mutually exclusive from each other, may overlap each other in various ways (where the overlap may be in the active portion of the redundancy domains based on sharing of active security nodes 121-A by redundancy domains or in the backup portion of the redundancy domains based on sharing of backup security nodes 121-B by redundancy domains), or the like. It will be appreciated that redundancy domains may be further understood by way of reference to FIG. 2.

The security redundancy architecture 120 may provide security for communications of the client devices 110 based on configuration of the security redundancy architecture 120 to support activity election, synchronization, and activity aware routing. It is noted that use of activity election, synchronization, and activity aware routing to provide security for communications of the client devices 110 is discussed further below.

The security redundancy architecture 120 may provide security for communications of the client devices 110 based on configuration of the security redundancy architecture 120 to support activity election. Activity election supports election of a security node 121 of a redundancy domain to be an active security node 121-A for the redundancy domain and configuration of security nodes 121 to be backup security nodes 121-B for the redundancy domain. In activity election for a redundancy domain, each of the security nodes 121 has an administrative role and a runtime role. For a security node 121, the administrative role may be either "designated active" or "designated standby". For a security node 121, the runtime role may be either "operational active" (e.g., the security node is currently operating as an active security node 121-A for the redundancy domain) or "operational standby" (e.g., the security node is currently operating as a backup security node 121-B that is "active" in the sense that it is available to take over as an active security node 121-A for the redundancy domain, if needed).

In the security redundancy architecture 120, the administrative roles for the security nodes 121 in a redundancy domain may be specified by user configuration. The administrative roles for the security nodes 121 may be specified by user configuration in response to various events associated with the redundancy domain. For example, the administrative roles for the security nodes 121 may be specified by user configuration when the security nodes 121 are deployed (e.g., for addition of security nodes 121 to existing redundancy domains, creation of new redundancy domains, or the like), at any time after the security nodes 121 are deployed (e.g., for reconfiguration of existing redundancy domains, creation of new redundancy domains, or the like), or the like, as well as various combinations thereof. The specification of the administrative roles for the security nodes 121 by user configuration may be performed using various user configuration capabilities, such as various types of interfaces to the security nodes 121 (e.g., graphical user interfaces (GUIs) of management systems, command line interfaces (CLIs), or the like), using various types of management protocols, or the like, as well as various combinations thereof. The administrative roles for the security nodes 121 may be specified by user configuration in various other ways.

In the security redundancy architecture 120, the runtime roles for the security nodes 121 in a redundancy domain may be determined based on an activity election protocol. For example, the activity election protocol may be a headship election protocol or other suitable type of activity election protocol. The activity election protocol may be run within a redundancy domain, to specify the runtime roles for the security nodes 121 in the redundancy domain, in response to various events associated with the redundancy domain. For example, the activity election protocol may be run within a redundancy domain, to specify the runtime roles for the security nodes 121 in the redundancy domain, during initial configuration of the redundancy domain, in response to the failure of an active security node 121-A of the redundancy domain, or the like, as well as various combinations thereof. The activity election protocol may be based on various types of messaging between the security nodes 121 of the redundancy domain. The runtime roles for the security nodes 121 may be specified based on the activity election protocol in various other ways.

The security redundancy architecture 120 may provide security for communications of the client devices 110 based on configuration of the security redundancy architecture 120 to support synchronization. Synchronization may be based on a synchronization protocol supported by the security nodes 121 and supporting communications between the security nodes 121 for purposes of synchronization. Synchronization enables each of the security nodes 121 in a redundancy domain, including the active security node 121-A and the backup security nodes 121-B, to support the same set of security session state information (e.g., IPSec states where security is based on IPSec).

In the security redundancy architecture 120, an active security node 121-A of a redundancy domain controls synchronization of the security session state information for the redundancy domain by providing security session state information for the redundancy domain to each of the backup security nodes 121-B of the redundancy domain, thereby enabling each of the backup security nodes 121-B to take over as an active security node 121-A for the redundancy domain in response to a failover event (e.g., failure of the active security node 121-A, unavailability of the active security node 121-A, or the like). The active security node 121-A of the redundancy domain may provide the security session state information for the redundancy domain to each of the backup security nodes 121-B of the redundancy domain as the security session state information is generated (e.g., created for new security sessions, created for modified for existing security sessions, or the like), periodically, or the like, as well as various combinations thereof.

In the security redundancy architecture 120, depending on the amount of security session state information that is used by the security protocol to support security for communications of the client device 110, it may be difficult or impossible for dynamic synchronization of all security session state information across the security nodes 121 in a redundancy domain. In at least some example embodiments, a portion of the available security session state information may be synchronized from the active security node 121-A of the redundancy domain to the backup security nodes 121-B of the redundancy domain (e.g., only that security session state information that is needed in order to support opaque failover from an active security node 121-A to a backup security node 121-B when the active security node 121-A can no longer provide security for communications in the redundancy domain). In at least example embodiments, a portion of available security session state information may be synchronized from the active security node 121-A of the redundancy domain to the backup security nodes 121-B of the redundancy domain and, further, the backup security nodes 121-B may locally and independently derive any remaining security session state information (e.g., based on one or more heuristics).

The security redundancy architecture 120 may provide security for communications of the client devices 110 based on configuration of the security redundancy architecture 120 to support activity aware routing. Activity aware routing enables the traffic of a client device 110, including traffic from the client device 110 and traffic destined for the client device 110, to be attracted to operational active security nodes 121-A in a redundancy domain rather than the operational backup security node(s) 121-B in the redundancy domain. In a redundancy domain, each of the security nodes 121 advertises the same endpoint address route (e.g., an IPsec gateway address route where IPSec is used) and the same payload route, but with different metrics (namely, the operational active security node 121-A of the redundancy domain will advertise better metrics than the operational backup security nodes 121-B for the endpoint address route and the payload route such that the traffic of the client device 110 will be attracted to the operational active security node 121-A). It is noted that, in a redundancy domain, in the case of a route issue (e.g., route re-convergence or other route issues), where traffic of a client device 110 is received by a backup security node 121-B of the redundancy domain rather than the active security node 121-A of the redundancy domain, the backup security node 121-B of the redundancy domain may send the traffic of the client device 110 to the active security node 121-A via an IP tunnel or other suitable type of channel.

Figure 2:
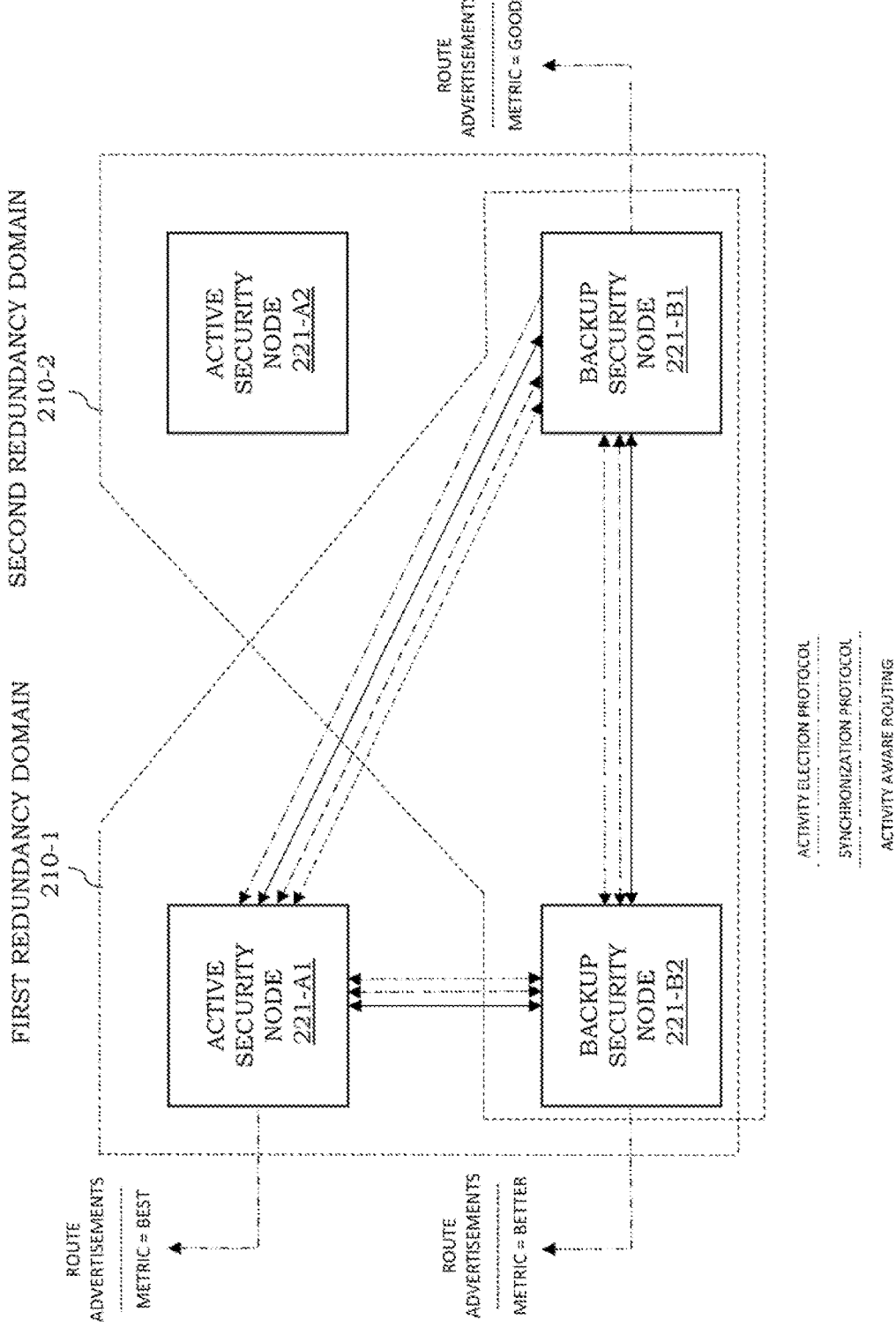
FIG. 2 depicts an example embodiment of a system including a pair of redundancy domains created using a common set of security nodes of a security redundancy architecture.

It will be appreciated that use of redundancy domains for security redundancy, including use of activity election, synchronization, and activity aware routing within redundancy domains, may be further understood by way of reference to the example of FIG. 2.

FIG. 2 depicts an example embodiment of a system including a pair of redundancy domains created using a common set of security nodes of a security redundancy architecture.

In FIG. 2, system 200 includes a pair of redundancy domains 210 that includes a first redundancy domain 210-1 and a second redundancy domain 210-2. The redundancy domains 210 are formed using a set of four security nodes 221 including security node 221-A1, 221-A2, 221-B1, and 221-B2. The security nodes 221-A1 and 221-A2 are designated active nodes (and may be referred to collectively as active security nodes 221-A) and the security nodes 221-B1 and 221-B2 are designated backup nodes (and may be referred to collectively as backup security nodes 221-B). The first redundancy domain 210-1 includes security nodes 221-A1, 221-B1, and 221-B2, and the second redundancy domain 210-2 includes security nodes 221-A2, 221-B1, and 221-B2. So, security node 221-A1 is backed up by both security node 221-B1 and security node 221-B2 and, similarly, security node 221-A2 is backed up by both security node 221-B1 and security node 221-B2.

In FIG. 2, the activity election protocol is running across the security nodes 221 in the redundancy domains 210. For example, in the first redundancy domain 210-1, assuming that security node 221-B1 has a higher priority than security node 221-B2 then, if security node 221-A1 fails then security node 221-B1 will take over as the active security node in the first redundancy domain 210-1 unless security node 221-B1 is not available to take over for security node 221-A1 (e.g., if security node 221-B1 has also failed or has already become active for the second redundancy domain 210-2) in which case the security node 221-B2 will take over as the active security node in the first redundancy domain 210-1. Similarly, for example, in the second redundancy domain 210-2, assuming that security node 221-B2 has a higher priority than security node 221-B1 then, if security node 221-A2 fails then security node 221-B2 will take over as the active security node in the first redundancy domain 210-1 unless security node 221-B2 is not available to take over for security node 221-A2 (e.g., if security node 221-B2 has also failed or has already become active for the first redundancy domain 210-1) in which case the security node 221-B1 will take over as the active security node in the second redundancy domain 210-2.

In FIG. 2, the synchronization protocol is running across the security nodes 221 in the redundancy domains 210. For example, in the first redundancy domain 210-1, the security node 221-A1 will maintain security session state information for security sessions it supports, and will provide security session state information for the security sessions to security nodes 221-B1 and 221-B2 which may have to take over as active nodes for the security node 221-A1, such that fast failover to either of the security nodes 221-B1 or 221-B2 may be performed, when the security node 221-A1 fails, in a manner that is opaque to the client devices for which the security sessions are supported (namely, such that either of the security nodes 221-B1 and 221-B2 can resume security processing while preventing or minimizing traffic interruption for client devices). Similarly, for example, in the first redundancy domain 210-1, the security node 221-A2 will maintain security session state information for security sessions it supports, and will provide security session state information for the security sessions to security nodes 221-B1 and 221-B2 which may have to take over as active nodes for the security node 221-A2, such that fast failover to either of the security nodes 221-B1 or 221-B2 may be performed, when the security node 221-A2 fails, in a manner that is opaque to the client devices for which the security sessions are supported (namely, such that either of the security nodes 221-B1 and 221-B2 can resume security processing while preventing or minimizing traffic interruption for client devices). It will be appreciated that, in the redundancy domains 210, if a security node 221 participates in multiple domains (e.g., the backup security nodes 221-B that each participate in both of the redundancy domains 210), the security node 221 will maintain security session state information for each of the redundancy domains in which the security node 221 participates and will only activate the security session state information for given redundancy domain 210 when operating as the operational active for the given redundancy domain 210.

In FIG. 2, activity aware routing is supported by the security nodes 221 in the redundancy domains 210. In the first redundancy domain 210-1, each of the security nodes 221 (namely, security nodes 221-A1, 221-B1, and 221-B2) advertises the same endpoint address route and the same payload route, but with different metrics (namely, the operational active security node 221-A1 will advertise better metrics than the operational backup security nodes 221-B1 and 221-B2 for the endpoint address route and the payload route such that the traffic of the client device will be attracted to the operational active security node 221-A1). Similarly, in the second redundancy domain 210-2, each of the security nodes 221 (namely, security nodes 221-A2, 221-B1, and 221-B2) advertises the same endpoint address route and the same payload route, but with different metrics (namely, the operational active security node 221-A2 will advertise better metrics than the operational backup security nodes 221-B1 and 221-B2 for the endpoint address route and the payload route such that the traffic of the client device will be attracted to the operational active security node 221-A1). It is noted that, in either of the redundancy domains 210, in the case of a route issue (e.g., route re-convergence or other route issues), where traffic of a client device for one of the redundancy domains 210 is received by either of the backup security nodes 221-B of the one of the redundancy domains 210 rather than the active security node 221-A of the one of the redundancy domains 210, the backup security node 221-B that receives the traffic of the client device may send the traffic of the client device 110 to the active security node 221-A of the one of the redundancy domains 210 via an IP tunnel or other suitable type of channel.

It is noted that, in each of the redundancy domains 210, the security nodes 221 within the redundancy domains 210 are configured to communicate for purposes of supporting security redundancy (e.g., including communications for use of activity election, synchronization, and activity aware routing within the redundancy domains 210). This is represented for the first redundancy domain 210-1 using the solid lines connecting the security nodes 221 of the first redundancy domain 210-1 and is omitted for the second redundancy domain 210-2 for purposes of clarity.

It will be appreciated that, although primarily presented with respect to a security redundancy architecture including specific numbers, types, and arrangements of security nodes, security redundancy architectures may be provided using various other numbers types, and arrangements of security nodes.

Figure 3:
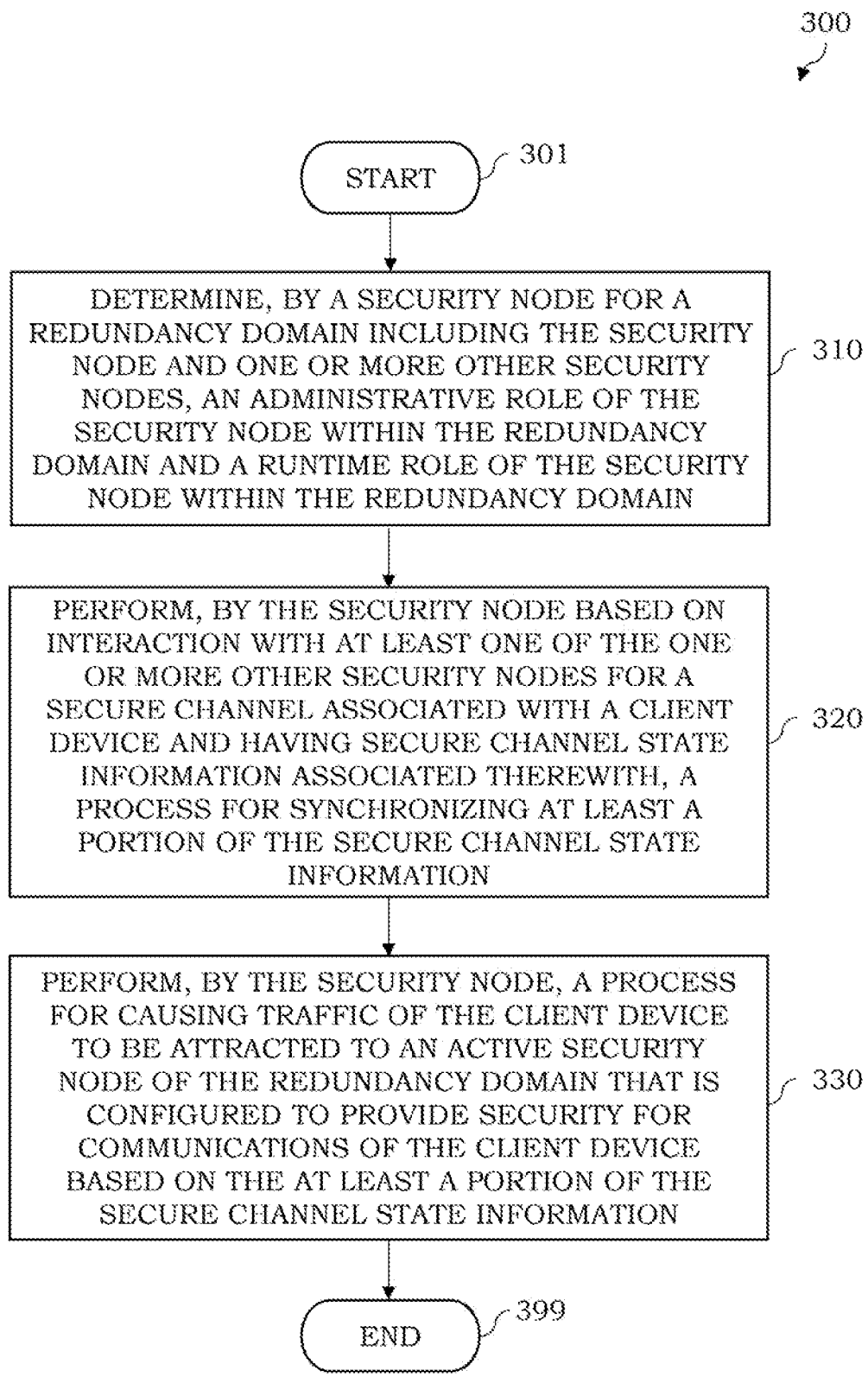
FIG. 3 depicts an example embodiment of a method for use by a security node to support security for a client device.

FIG. 3 depicts an example embodiment of a method for use by a security node to support security for a client device. It will be appreciated that, although primarily presented as being performed serially, at least a portion of the functions of method 300 may be performed contemporaneously or in a different order than as presented with respect to FIG. 3. At block 301, method 300 begins. At block 310, determine, by a security node for a redundancy domain including the security node and one or more other security nodes, an administrative role of the security node within the redundancy domain and a runtime role of the security node within the redundancy domain. At block 320, perform, by the security node based on interaction with at least one of the one or more other security nodes for a secure channel associated with a client device and having secure channel state information associated therewith, a process for synchronizing at least a portion of the secure channel state information. At block 330, perform, by the security node, a process for causing traffic of the client device to be attracted to an active security node of the redundancy domain that is configured to provide security for communications of the client device based on the at least a portion of the secure channel state information. At block 399, the method 300 ends. It will be appreciated that various other aspects of FIGS. 1-2 also may be incorporated within the method 300 of FIG. 3.

Figure 4:
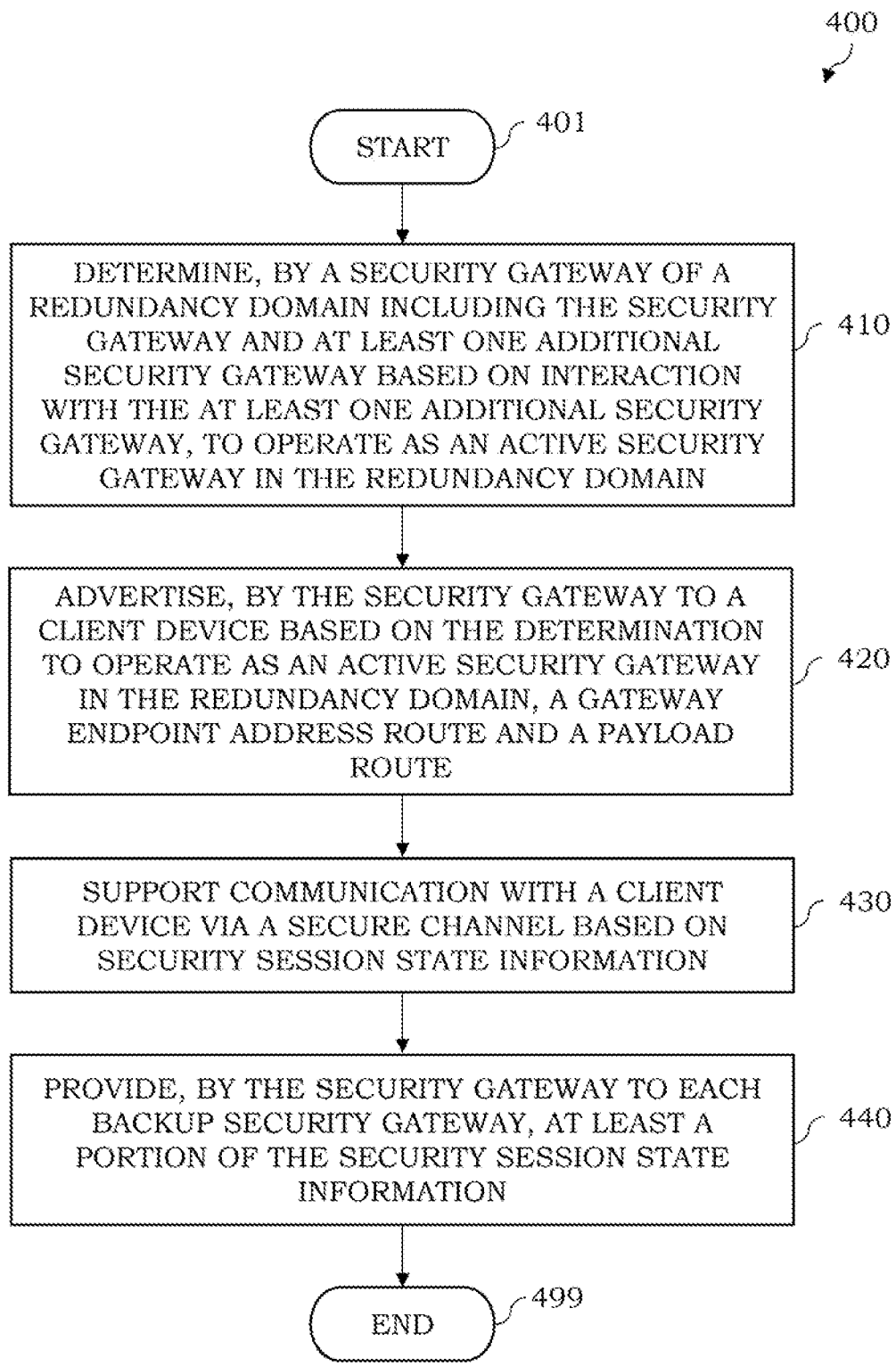
FIG. 4 depicts an example embodiment of a method for use by a security node to support security for a client device.

FIG. 4 depicts an example embodiment of a method for use by a security node to support security for a client device. It will be appreciated that, although primarily presented as being performed serially, at least a portion of the functions of method 400 may be performed contemporaneously or in a different order than as presented with respect to FIG. 4. At block 401, method 400 begins. At block 410, determine, by a security gateway of a redundancy domain including the security gateway and at least one additional security gateway based on interaction with the at least one additional security gateway, to operate as an active security gateway in the redundancy domain. At block 420, advertise, by the security gateway to a client device based on the determination to operate as an active security gateway in the redundancy domain, a gateway endpoint address route and a payload route. At block 430, support communication with a client device via a secure channel based on security session state information. At block 440, provide, by the security gateway to each backup security gateway, at least a portion of the security session state information. At block 499, the method 400 ends. It will be appreciated that various other aspects of FIGS. 1-2 also may be incorporated within the method 400 of FIG. 4.

Figure 5:
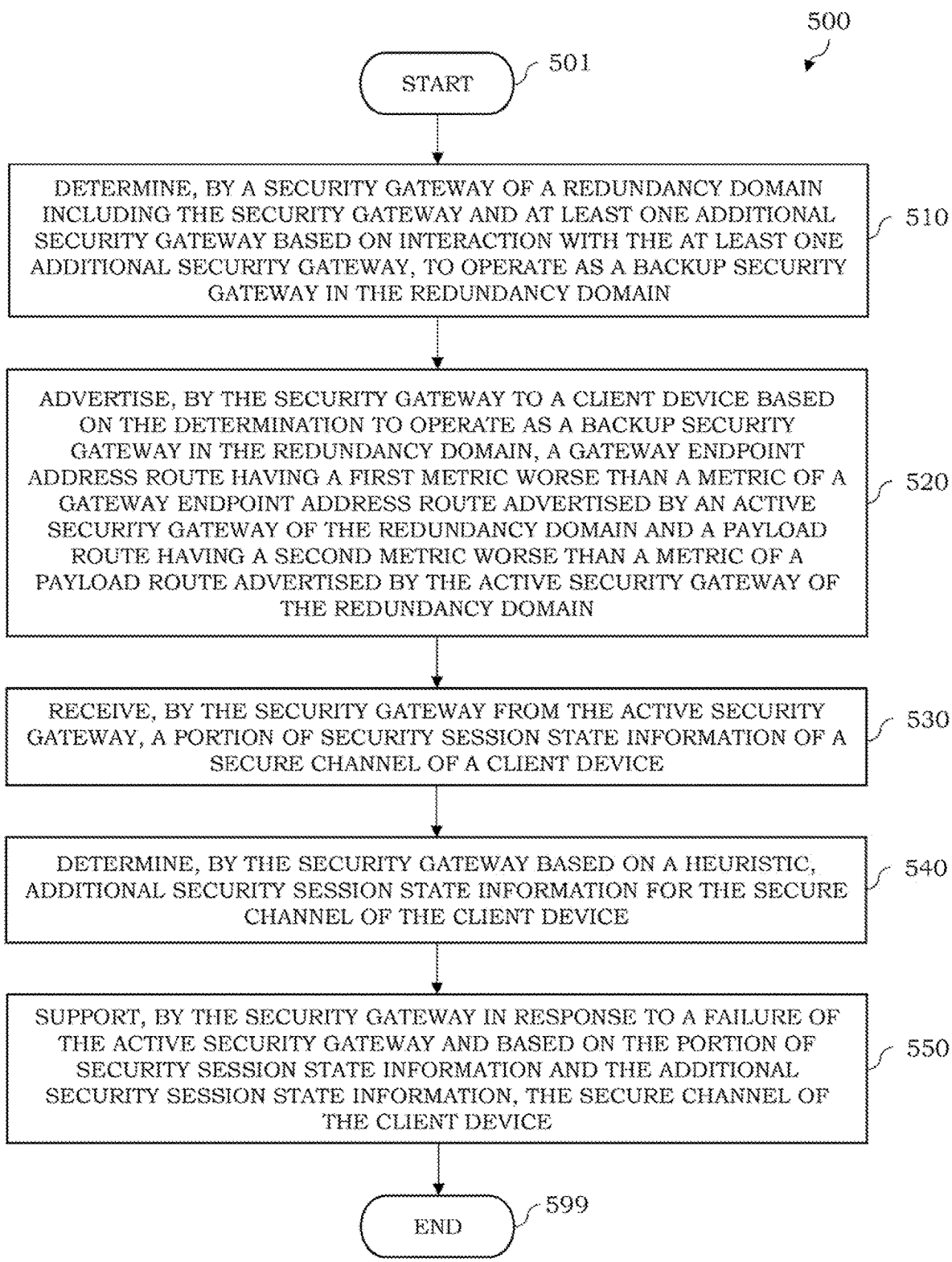
FIG. 5 depicts an example embodiment of a method for use by a security node to support security for a client device.

FIG. 5 depicts an example embodiment of a method for use by a security node to support security for a client device. It will be appreciated that, although primarily presented as being performed serially, at least a portion of the functions of method 500 may be performed contemporaneously or in a different order than as presented with respect to FIG. 5. At block 501, method 500 begins. At block 510, determine, by a security gateway of a redundancy domain including the security gateway and at least one additional security gateway based on interaction with the at least one additional security gateway, to operate as a backup security gateway in the redundancy domain. At block 520, advertise, by the security gateway to a client device based on the determination to operate as a backup security gateway in the redundancy domain, a gateway endpoint address route having a first metric worse than a metric of a gateway endpoint address route advertised by an active security gateway of the redundancy domain and a payload route having a second metric worse than a metric of a payload route advertised by the active security gateway of the redundancy domain. At block 530, receive, by the security gateway from the active security gateway, a portion of security session state information of a secure channel of a client device. At block 540, determine, by the security gateway based on a heuristic, additional security session state information for the secure channel of the client device. At block 550, support, by the security gateway in response to a failure of the active security gateway and based on the portion of security session state information and the additional security session state information, the secure channel of the client device. At block 599, the method 500 ends. It will be appreciated that various other aspects of FIGS. 1-2 also may be incorporated within the method 500 of FIG. 5.

Figure 6:
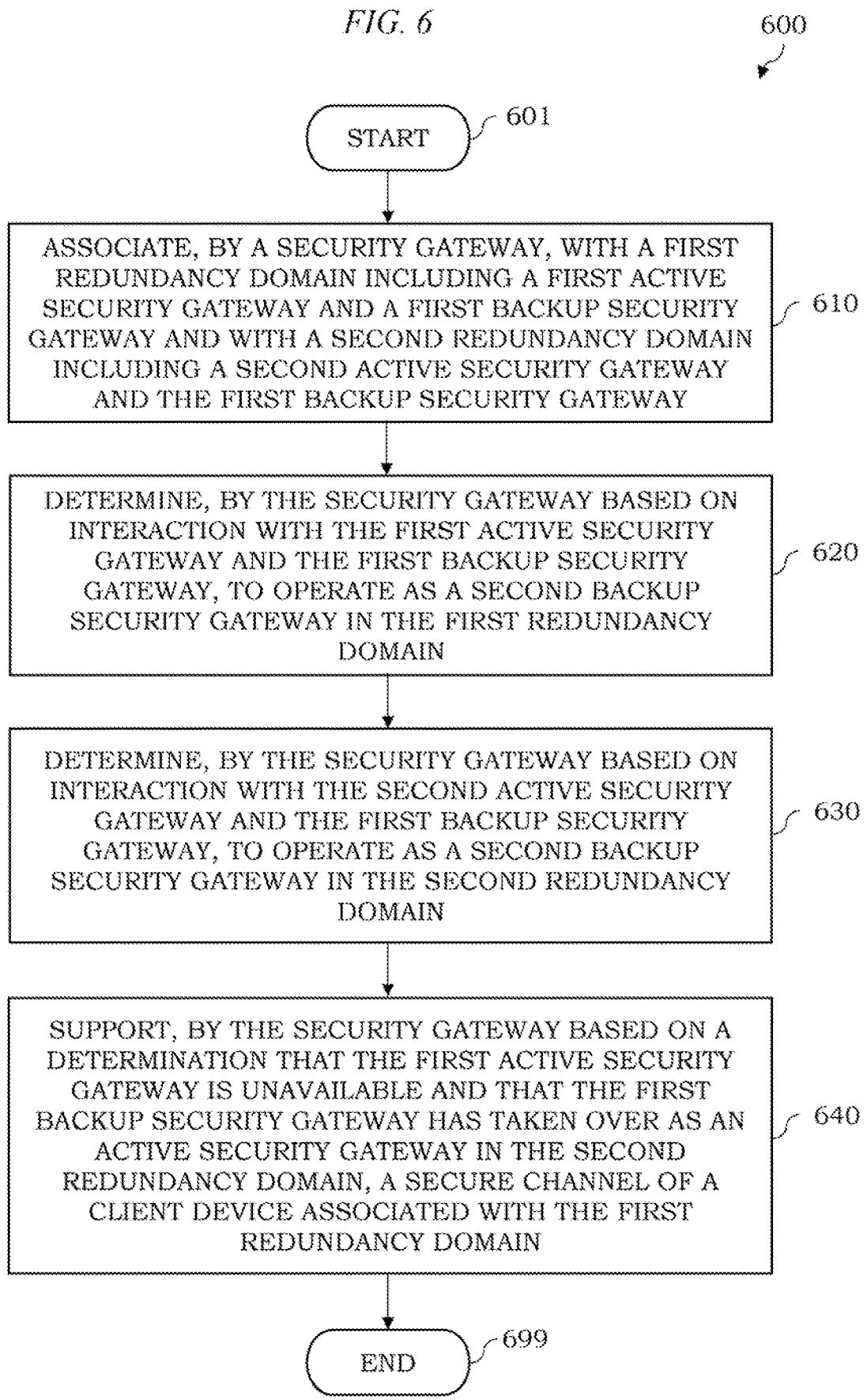
FIG. 6 depicts an example embodiment of a method for use by a security node to support security for a client device.

FIG. 6 depicts an example embodiment of a method for use by a security node to support security for a client device. It will be appreciated that, although primarily presented as being performed serially, at least a portion of the functions of method 600 may be performed contemporaneously or in a different order than as presented with respect to FIG. 6. At block 601, method 600 begins. At block 610, associate, by a security gateway, with a first redundancy domain including a first active security gateway and a first backup security gateway and with a second redundancy domain including a second active security gateway and the first backup security gateway. At block 620, determine, by the security gateway based on interaction with the first active security gateway and the first backup security gateway, to operate as a second backup security gateway in the first redundancy domain. At block 630, determine, by the security gateway based on interaction with the second active security gateway and the first backup security gateway, to operate as a second backup security gateway in the second redundancy domain. At block 640, support, by the security gateway based on a determination that the first active security gateway is unavailable and that the first backup security gateway has taken over as an active security gateway in the second redundancy domain, a secure channel of a client device associated with the first redundancy domain. At block 699, the method 600 ends. It will be appreciated that various other aspects of FIGS. 1-2 also may be incorporated within the method 600 of FIG. 6.

Figure 7:
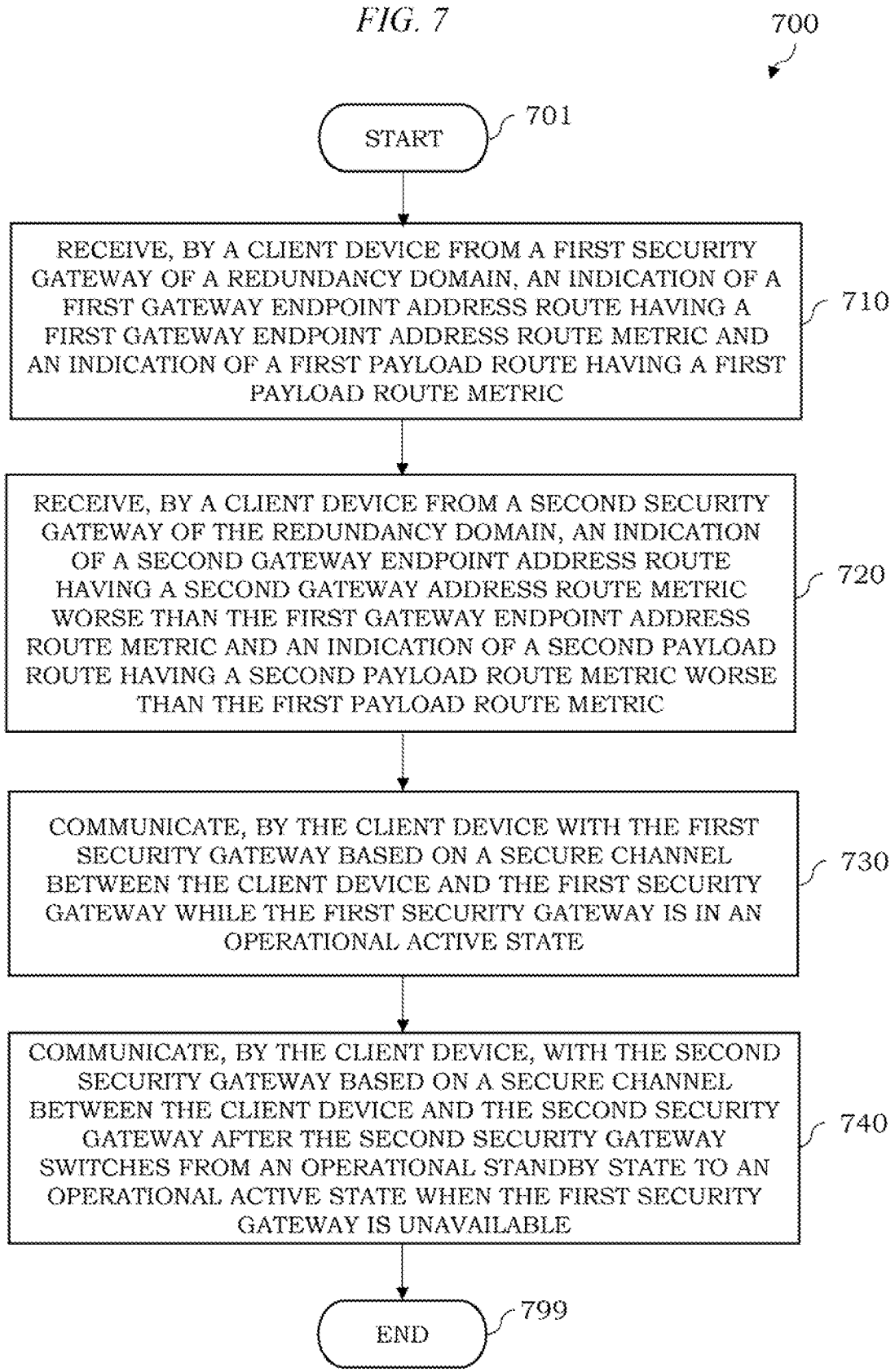
FIG. 7 depicts an example embodiment of a method for use by a client device to support security redundancy based on a set of security nodes arranged in a security redundancy architecture.

FIG. 7 depicts an example embodiment of a method for use by a client device to support security redundancy based on a set of security nodes arranged in a security redundancy architecture. It will be appreciated that, although primarily presented as being performed serially, at least a portion of the functions of method 700 may be performed contemporaneously or in a different order than as presented with respect to FIG. 7. At block 701, method 700 begins. At block 710, receive, by a client device from a first security gateway of a redundancy domain, an indication of a first gateway endpoint address route having a first gateway endpoint address route metric and an indication of a first payload route having a first payload route metric. At block 720, receive, by a client device from a second security gateway of the redundancy domain, an indication of a second gateway endpoint address route having a second gateway address route metric worse than the first gateway endpoint address route metric and an indication of a second payload route having a second payload route metric worse than the first payload route metric. At step 730, communicate, by the client device with the first security gateway based on a secure channel between the client device and the first security gateway while the first security gateway is in an operational active state. At step 740, communicate, by the client device, with the second security gateway based on a secure channel between the client device and the second security gateway after the second security gateway switches from an operational standby state to an operational active state when the first security gateway is unavailable. At block 799, the method 700 ends. It will be appreciated that various other aspects of FIGS. 1-2 also may be incorporated within the method 700 of FIG. 7.

Various example embodiments for supporting security in a communication system may provide various advantages or potential advantages. For example, various example embodiments for supporting security in a communication system may be configured to provide N:M redundancy for IPSec or other security protocol suites or protocols configured to support secure communications of devices in communication systems. For example, various example embodiments for supporting security in a communication system may be configured to provide N:M redundancy for IPSec or other security protocol suites or protocols configured to support secure communications of devices in communication systems, where the number of active and backup security nodes may be different (e.g., N active security nodes may be backed up by M backup security nodes). For example, various example embodiments for supporting security in a communication system may be configured to provide N:M redundancy in a manner enabling prioritization of multiple backup security nodes which are protecting an active security nodes. For example, various example embodiments for supporting security in a communication system may be configured to provide N:M redundancy in a manner enabling a backup security node to protect multiple active security nodes using a common set of hardware resources. For example, various example embodiments for supporting security in a communication system may be configured to provide N:M stateful geo-redundancy for IPSec or other security protocol suites or protocols configured to support secure communications of devices in communication systems. Various example embodiments for supporting security in a communication system may provide various other advantages or potential advantages.

Figure 8:
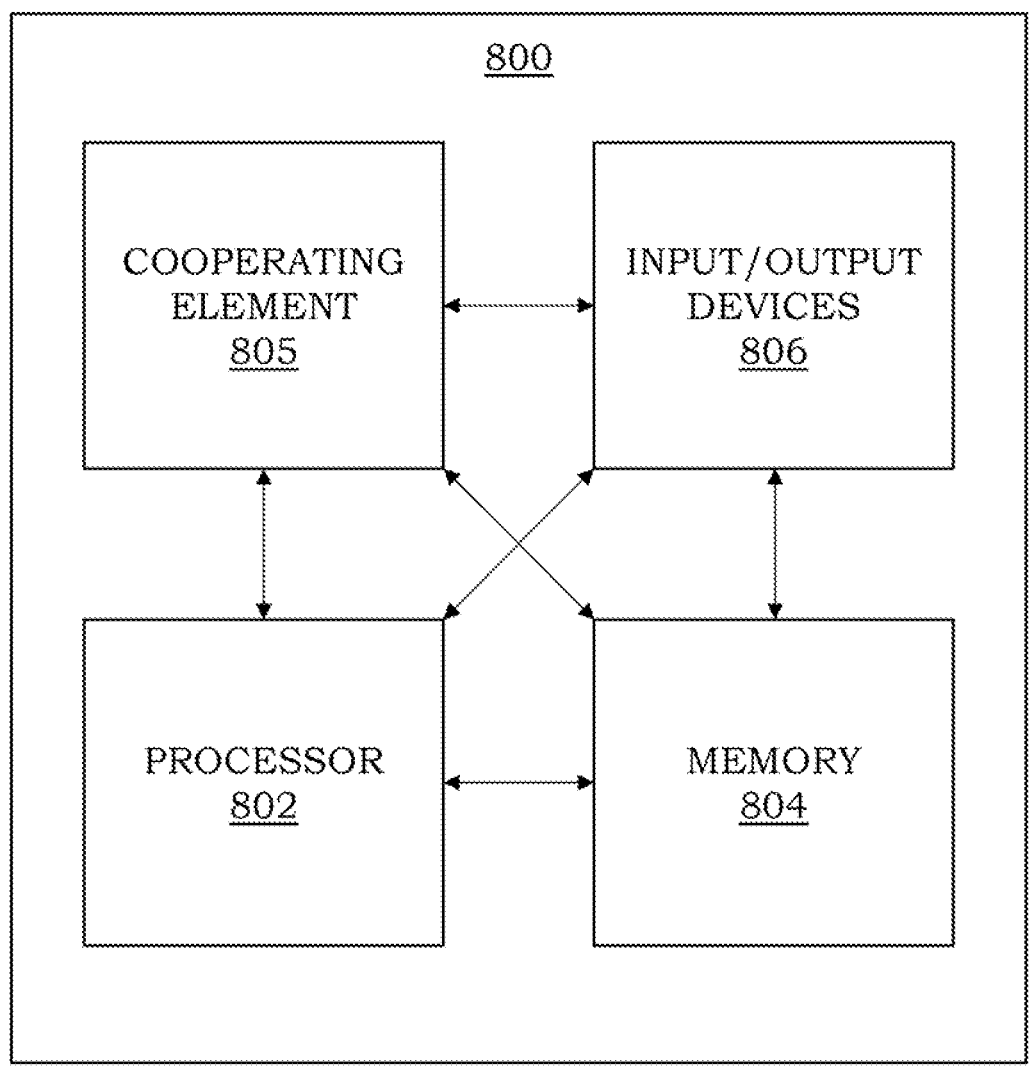
FIG. 8 depicts an example of a computer suitable for use in performing various functions presented herein.

FIG. 8 depicts an example embodiment of a computer suitable for use in performing various functions presented herein.

The computer 800 includes a processor 802 (e.g., a central processing unit, a processor, a processor having a set of processor cores, a processor core of a processor, or the like) and a memory 804 (e.g., a random access memory, a read only memory, or the like). The processor 802 and the memory 804 may be communicatively connected. In at least some embodiments, the computer 800 may include at least one processor and at least one memory including instructions wherein the instructions are configured to, when executed by the at least one processor, cause the apparatus to perform various functions presented herein.

The computer 800 also may include a cooperating element 805. The cooperating element 805 may be a hardware device. The cooperating element 805 may be a process that can be loaded into the memory 804 and executed by the processor 802 to implement various functions presented herein (in which case, for example, the cooperating element 805 (including associated data structures) can be stored on a non-transitory computer-readable storage medium, such as a storage device or other suitable type of storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements described herein, or the like, as well as various combinations thereof. For example, computer 800 may provide a general architecture and functionality that is suitable for implementing one or more elements presented herein, such as a client device 110 or a portion thereof, a security gateway 121 or a portion thereof, a security gateway 221 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various example embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions which, when executed by the at least one processor, cause the apparatus at least to:
   maintain, by an active security node associated with a security domain including the active security node and a set of backup security nodes, channel state information for a channel of a client device; and
   provide, by the active security node to the backup security nodes, the channel state information for the channel of the client device.

2. The apparatus of claim 1, wherein the instructions, when executed by the at least one processor, cause the apparatus at least to:
   support, by the active security node, an activity election process configured to cause election of the active security node to be the active security node within the security domain.

3. The apparatus of claim 2, wherein the activity election process is based on at least one of an administrative role of the active security node or a runtime role of the active security node.

4. The apparatus of claim 1, wherein the instructions, when executed by the at least one processor, cause the apparatus at least to:
   advertise, by the active security node, a route advertised by the backup security nodes but having an associated metric different than respective metrics advertised by the backup security nodes.

5. The apparatus of claim 4, wherein the associated metric of the route advertised by the active security node is configured to cause traffic of the client device to be attracted to the active security node.

6. The apparatus of claim 1, wherein the instructions, when executed by the at least one processor, cause the apparatus at least to:
   receive, from one of the backup security nodes during a route convergence condition, traffic of the client.

7. The apparatus of claim 1, wherein the instructions, when executed by the at least one processor, cause the apparatus at least to:
   switch, by the active security node, to operate as a new backup security node within the security domain while continuing to operate as an existing active security node within a second security domain.

8. An apparatus, comprising:
   at least one processor; and
   at least one memory storing instructions which, when executed by the at least one processor, cause the apparatus at least to:

receive, by a backup security node from an active security node, channel state information for a channel of a client device supported by the active security node; and
activate, by the backup security node based on a failure of the active security node and using the channel state information for the channel of the client device, a state of the channel of the client device at the backup security node.

9. The apparatus of claim 8, wherein the instructions, when executed by the at least one processor, cause the apparatus at least to:
support, by the backup security node, an activity election process configured to cause election of the active security node to be the active security node within a security domain that includes the active security node and the backup security node.

10. The apparatus of claim 9, wherein the activity election process is based on at least one of an administrative role of the backup security node or a runtime role of the backup security node.

11. The apparatus of claim 8, wherein the instructions, when executed by the at least one processor, cause the apparatus at least to:
advertise, by the backup security node, a route advertised by the active security node but having an associated metric different than a metric advertised by the active security node.

12. The apparatus of claim 11, wherein the metric of the route advertised by the backup security node is configured to cause traffic of the client device to be attracted to the active security node.

13. The apparatus of claim 8, wherein the instructions, when executed by the at least one processor, cause the apparatus at least to:
receive, by the backup security node during a route convergence condition, traffic of the client intended for the active security node; and
forward, by the backup security node toward the active security node, the traffic of the client intended for the active security node.

14. The apparatus of claim 8, wherein the instructions, when executed by the at least one processor, cause the apparatus at least to:
switch, by the backup security node, to operate as a new active security node within the security domain while continuing to operate as an existing backup security node within a second security domain.

15. An apparatus, comprising:
at least one processor; and
at least one memory storing instructions which, when executed by the at least one processor, cause the apparatus at least to:
associate, by a first backup security node, with a first security domain including a first active security node, the first backup security node, and a second backup security node;
associate, by the first backup security node, with a second security domain including a second active security node, the first backup security node, and the second backup security node; and
maintain, by the first backup security node, channel state information including first channel state information associated with the first security domain and second channel state information associated with the second security domain.

16. The apparatus of claim 15, wherein the instructions, when executed by the at least one processor, cause the apparatus at least to:
activate, by the first backup security node based on a failure of the first active security node, the first channel state information associated with the first security domain without activating the second channel state information associated with the second security domain.

17. The apparatus of claim 15, wherein the instructions, when executed by the at least one processor, cause the apparatus at least to:
activate, by the first backup security node based on a failure of the second active security node, the second channel state information associated with the second security domain without activating the first channel state information associated with the first security domain.

18. The apparatus of claim 15, wherein the instructions, when executed by the at least one processor, cause the apparatus at least to:
advertise, by the first backup security node, a route advertised by the first active security node and the second backup security node, but having an associated metric different than respective metrics advertised by the first active security node and the second backup security node.

19. The apparatus of claim 15, wherein the instructions, when executed by the at least one processor, cause the apparatus at least to:
advertise, by the first backup security node, a route advertised by the first active security node and the second backup security node, but having an associated metric different than respective metrics advertised by the first active security node and the second backup security node.

20. The apparatus of claim 15, wherein the instructions, when executed by the at least one processor, cause the apparatus at least to:
receive, by the first backup security node during a route convergence condition, traffic of the client intended for the first active security node; and
forward, by the first backup security node toward the first active security node, the traffic of the client intended for the first active security node.

* * * * *